US006272533B1

(12) United States Patent
Browne

(10) Patent No.: US 6,272,533 B1
(45) Date of Patent: Aug. 7, 2001

(54) SECURE COMPUTER SYSTEM AND METHOD OF PROVIDING SECURE ACCESS TO A COMPUTER SYSTEM INCLUDING A STAND ALONE SWITCH OPERABLE TO INHIBIT DATA CORRUPTION ON A STORAGE DEVICE

(76) Inventor: Hendrik A. Browne, 6211 Florence Way, Alexandria, VA (US) 22310

( * ) Notice: Subject to any disclaimer, the term of this patent is extended or adjusted under 35 U.S.C. 154(b) by 0 days.

(21) Appl. No.: 09/250,277

(22) Filed: Feb. 16, 1999

(51) Int. Cl.[7] .................................................... G06F 13/38
(52) U.S. Cl. ........................ 709/213; 710/128; 711/152; 711/100; 711/111; 711/154
(58) Field of Search .................................. 711/100, 111, 711/112, 154, 152; 360/60; 710/128, 131; 709/213

(56) References Cited

U.S. PATENT DOCUMENTS

| Re. 33,328 | * | 9/1990 | Director ............................. 360/60 X |
| 4,750,111 | * | 6/1988 | Crosby, Jr. et al. .................. 710/58 |
| 5,166,939 | * | 11/1992 | Jaffe et al. ........................... 714/766 |
| 5,268,960 | * | 12/1993 | Hung et al. ........................... 380/4 |
| 5,765,034 | * | 6/1998 | Recio ................................. 710/131 X |
| 5,920,893 | * | 7/1999 | Nakayama et al. .............. 709/213 X |
| 5,991,829 | * | 11/1999 | Giorgio et al. .................. 709/213 X |

FOREIGN PATENT DOCUMENTS

93/02419  *  2/1993  (WO) .

OTHER PUBLICATIONS

Control Data Corporation CDC Fixed Storage, vol. 2, Hardware Maintenance Manual, pp. i, ii, 1–1, 1–2, 1–22 through 1–30 and 1–160 through 1–165; 1984.*

Micron Electronics, Inc., Micron System User's Guide for Millennia and ClientPro Systems, 1998, pp. 4–19.

The RAID Advisory Board, Inc., The RAID Book, 6th ed., 1997, p. 16.

Janah, Monua, "The Cost of Networking," Information Week, Oct. 19, 1998, pp. 48 et seq.

Penenberg, Adam L., "We were long gone when he pulled the plug," Forbes, Nov. 16, 1998, pp. 134 et seq. (More legible copy of article taken from Forbes web site also attached.).

The PC Technology Guide, Motherboards, updated Oct. 12, 1998, http://www.dircon.co.uk/pctechguide.

(List continued on next page.)

Primary Examiner—David L. Robertson
(74) Attorney, Agent, or Firm—Fulbright & Jaworski LLP

(57) ABSTRACT

A computer system includes hardware for selectively disabling alteration of data residing on a mass storage device which is subject to remote access. In one embodiment, a hard disk drive is operated in a conventional manner including both read and write modes when the system is being operated in a non-secure mode of operation, such as when remote access is not allowed. In a secure mode of operation, a locally operated switch is used to disable writing to the hard disk drive to maintain data integrity on the drive. The system may also include first and second electrically isolated buses and corresponding processors. In this configuration, the hard disk drive may be selectively connected to the first bus and processor for the storage of data, or to the second bus and processor when in a secure mode to provide for read-only remote access to the information stored on the hard drive. A write-only hard drive may also be included for storage of confidential information provided by remote users so that other remote users cannot access that information. In a master/slave processor configuration, all system programming is resident in an isolated portion of the system inaccessible to remote users. The slave processor receives instructions only from the master processor so that the operation of the slave processor cannot be compromised by viruses uploaded by remote users.

45 Claims, 9 Drawing Sheets

OTHER PUBLICATIONS

Intel Motherboard General FAQ, updated Aug. 31, 1998, http://www.connectedpc.com. (*Legal Information* © 1998 Intel Corp.).

The PC Technology Guide, Processors, updated Oct. 6, 1998, http://www.dircon.co.uk/pctechguide.

PICMG®—PCI–ISA, 1998, http://www.picmg.com (© 1998 PICMG).

PICMG ISA/PCI Passive Backplane (source information unavailable).

The PC Guide, System Bus Functions and Features, Site Version 1.7.2—Version Date: Sep. 20, 1998, http://www.pcguide.com (© Copyright 1997–98, Charles M. Kozierok).

The PC Guide, Older Bus Types, Site Version 1.7.2—Version Date: Sep. 20, 1998,http://www.pcguide.com (© Copyright 1997–98, Charles M. Kozierok).

The PC Guide, Peripheral Component Interconnect (PCI) Local Bus, Site Version 1.7.2—Version Date: Sep. 20, 1998, http://www.pcguide.com (© Copyright 1997–98, Charles M. Kozierok).

The PC Guide, System Buses, Site Version 1.7.2—Version Date: Sep. 20, 1998,http://www.pcguide.com (© Copyright 1997–98, Charles M. Kozierok).

PC Webopaedia, bus, Last modified May 14, 1998,http://www.webopedia.internet.com (© 1998 Mecklermedia Corporation.

PC Webopaedia, Industry Standard Architecture (ISA) bus, Last modified May 15, 1998, http://www.webopedia.internet.com (© 1998 Mecklermedia Corporation).

PC Webopaedia, PCI, Last modified May 19, 1998,http://www.webopedia.internet.com (© 1998 Mecklermedia Corporation).

PC Webopaedia, local bus, Last modified May 19, 1998, http://www.webopedia.internet.com (© 1998 Mecklermedia Corporation).

PC Webopaedia, expansion bus, Last modified Dec. 5, 1998,http://www.webopedia.internet.com (© 1998 Mecklermedia Corporation).

PC Webopaedia, external bus, Last modified Dec. 30, 1997, http://www.webopedia.internet.com (© 1998 Mecklermedia Corporation).

PC Webopaedia, SCSI, Last modified Oct. 1, 1998,http://www.webopedia.internet.com (© 1998 Mecklermedia Corporation.

The PC Guide, Hard Disk General Interface Factors, Site Version 1.7.2—Version Date: Sep. 20, 1998, http://www.pcguide.com (© Copyright 1997–98, Charles M. Kozierok).

Ögren, Joakim and Williams, Dan, Connector, IDE Internal Connector, http://www.margo.student.utwente.nl/stefan/hwb/co_IdeInternal.

* cited by examiner-

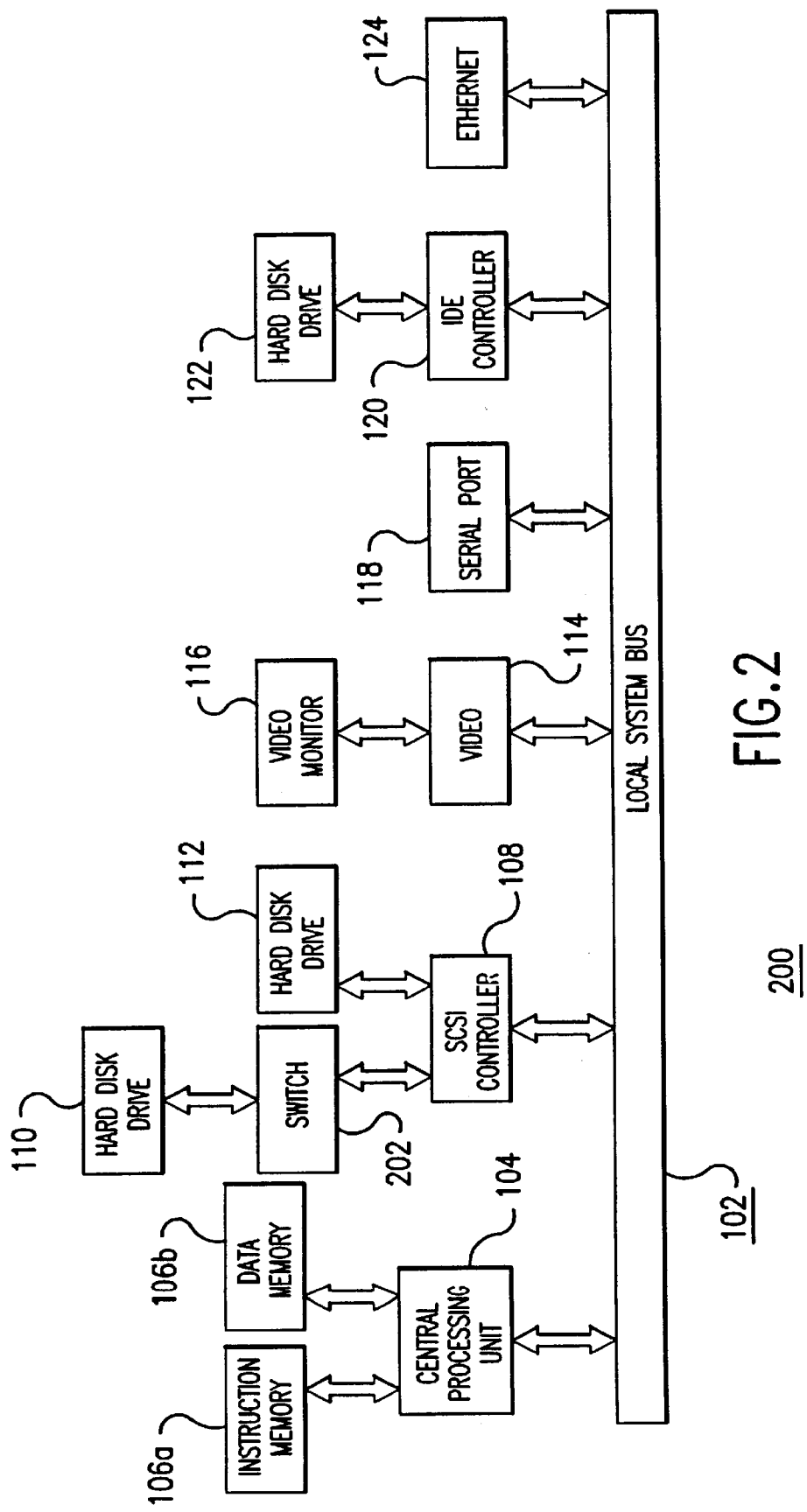

IDE PINOUT AT CONTROLLER AND PERIPHERAL

IDE PINOUT AT CABLE

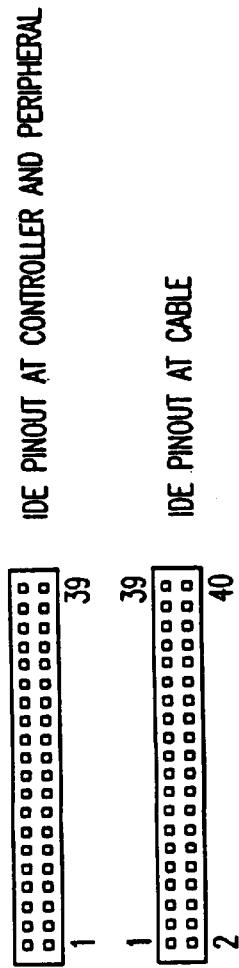

| PIN | NAME | DIR. | DESCRIPTION |
|---|---|---|---|
| 1 | /RESET | | RESET |
| 2 | GND | ⇑ | GROUND |
| 3 | DD7 | ⇕ | DATA 7 |
| 4 | DD8 | ⇕ | DATA 8 |
| 5 | DD6 | ⇕ | DATA 6 |
| 6 | DD9 | ⇕ | DATA 9 |
| 7 | DD5 | ⇕ | DATA 5 |
| 8 | DD10 | ⇕ | DATA 10 |
| 9 | DD4 | ⇕ | DATA 4 |
| 10 | DD11 | ⇕ | DATA 11 |
| 11 | DD3 | ⇕ | DATA 3 |
| 12 | DD12 | ⇕ | DATA 12 |
| 13 | DD2 | ⇕ | DATA 2 |
| 14 | DD13 | ⇕ | DATA 13 |
| 15 | DD1 | ⇕ | DATA 1 |

| PIN | NAME | DIR. | DESCRIPTION |
|---|---|---|---|
| 16 | DD14 | ⇕ | DATA 14 |
| 17 | DD0 | ⇕ | DATA 0 |
| 18 | DD15 | ⇕ | DATA 15 |
| 19 | GND | ⇕ | GROUND |
| 20 | KEY | | KEY |
| 21 | N/C | | NOT CONNECTED |
| 22 | GND | ⇑ | GROUND |
| 23 | /IOW | ⇑ | READ STROBE |
| 24 | GND | | GROUND |
| 25 | /IOR | ⇑ | READ STROBE |
| 26 | GND | | GROUND |
| 27 | IO_RDY | ⇓ | I/O CHANNEL |
| 28 | ALE | ⇑ | ADDRESS LATCH |
| 29 | N/C | | NOT CONNECTED |
| 30 | GND | | GROUND |

| PIN | NAME | DIR. | DESCRIPTION |
|---|---|---|---|
| 31 | IRQR | ⇓ | INTERRUPT REQUEST |
| 32 | /IOCS16 | | I/O CHIP SELECT |
| 33 | DA1 | | ADDRESS |
| 34 | N/C | | NOT CONNECTED |
| 35 | DA0 | ⇑ | ADDRESS 0 |
| 36 | DA2 | ⇑ | ADDRESS 2 |
| 37 | /IDE_CS0 | ⇑ | (1F0-1F7) |
| 38 | /IDE_CS1 | ⇑ | (3F6-3F1) |
| 39 | /ACTIVE | ⇑ | LED DRIVER |
| 40 | GND | | GROUND |

FIG.3

SECURE COMPUTER SYSTEM AND METHOD OF PROVIDING SECURE ACCESS TO A COMPUTER SYSTEM INCLUDING A STAND ALONE SWITCH OPERABLE TO INHIBIT DATA CORRUPTION ON A STORAGE DEVICE

BACKGROUND OF THE INVENTION

1. Field of the Invention

The present invention relates to computer system architecture and more particularly to an architecture for and method of limiting remote access to programs and data.

2. Description of the Related Technology

The role of computers is rapidly changing from computational machines to communication devices. The increasing use of the Internet by the general public increases the potential for hackers to break into sensitive computers. Computer hackers have successfully entered systems believed to be secure, gained unauthorized access, corrupted data, and infected systems with viruses that continue to cause havoc. While specialized software in the form of, for example, firewalls, is often provided to prevent unauthorized system access and to limit access so that unauthorized personnel cannot easily corrupt data and program files or otherwise cause damage to a computer system and loss of data, hackers are continually finding ways around the software. For example, viruses can be used to infect a computer system through infected software, causing the system to perform unauthorized functions and execute "rogue" code jeopardizing the integrity of the system. Because all functions performed by the computer system are controlled by instructions stored in the computer's memory, providing any remote access to the system provides an avenue for hackers to gain unauthorized access and do damage.

A representative computer system according to the prior art is shown in block diagram form in FIG. 1. A prior art computer system 100 includes a local system bus 102 connecting major elements of the computer system. Thus, local system bus 102 handles the transfer of instructions, data, address and control signals, etc. between the elements of the computer system. As shown in the figure, central processing unit 104 has a direct connection to bus 102 and to a dedicated main memory 106. Main memory 106 is typically a high speed, high bandwidth random access memory storing data and instructions. Non-volatile mass storage is provided by hard disk drives 110 and 112 interfacing via SCSI (small computer systems interface) device 108 to local system bus 102 and hard disk drive 122 interfacing through IDE (intelligent drive electronics) controller 120. Central processing unit 104 also has provisions for displaying data to a system operator by providing appropriate address, data and control signals to video interface 114 whereby data is displayed on video monitor 116. Finally, remote access to peripheral devices and buses is provided by serial port 118 and Ethernet interface 124, again over local system bus 102. Although not shown, other devices providing input and output to the system may be included, such as a keyboard, etc., which may include a dedicated interface to local system bus 102 or might be supported by serial port 118. Similarly, other output devices may be included, such as a printer interfacing through serial port 118 or an equivalent parallel port type data connection (not shown).

In operation, computer programs consisting of executable code and data and other information on which the code operates, are stored in main memory 106. Typically, this includes an operating system, such as Windows NT or Windows 98, together with various utilities and application programs. At startup or initialization, central processing unit 104 executes "boot" code, identifies system assets, such as IDE controller 120 and hard disk drive 122, and locates the appropriate operating system. The operating system software from hard disk drive 122 is then transferred through IDE controller 120 via local bus 102 to main memory 106. Central processing unit 104 then executes the operating system, transferring instructions as needed from main memory 106 into a "cache" or other local memory and registers that are a part of the central processing unit 104. While this is happening, dedicated hardware and firmware resident in video board 114 provide a visual display on video monitor 116 of system status and provide a video output for the operating system, utilities, and application programs. In addition to the online data storage provided by hard disk drive 122, multiple hard disk drives are supported by SCSI controller 108. As depicted, both hard disk drives 110 and 112 are interfaced to local system bus 102 through the SCSI controller 108 providing additional non-volatile storage capabilities.

In addition to local access to computer system 100, remote access is provided by serial port 118 and Ethernet card 124. For example, a modem (not shown) may be attached to serial port 118 to interface computer system 100 to other media such as the public switched telephone network (PSTN), radio and fiber optic systems, etc., thereby providing connectivity to remote users and systems. An appropriate communications utility or application running on central processing unit 104 together with serial port 118 supports exchange of data with the remote users and systems. Similarly, Ethernet 124 is a specific embodiment of a network connectivity supporting, for example, a local area network (LAN), a wide area network (WAN), etc., with multiple remote computer systems and other resources attached. Using these remote access facilities, computer system 100 becomes accessible to authorized, and in many cases, unauthorized users.

Although not shown, other peripherals may be included, such as CD-ROMS (compact disk—read only memories), CD-WORM (compact disk—write once read many) or CD-WO (compact disk—write once), CD-RW (compact disk—re-writeable), DVD-RAM (digital versatile disk—RAM), DVD-ROM (digital versatile disk—ROM), various tape drives and traditional 3½ inch floppy disk drives. These devices are particularly useful for the transport of data between systems and backup purposes using removable media. Conventionally, because of access speed and storage space limitations, these devices are generally not relied upon as substitutes for hard disk drives which continue to be used as the primary media for non-volatile program and data mass storage. However, as computer systems have been made available to greater numbers of users, both locally and remotely, maintaining the integrity of programs and data stored on computer systems has become an increasing concern.

Prior art systems implement various physical and software systems to control access to the system and provide security. For example, computer systems handling classified information may require TEMPEST approval to avoid unintended radiation of information, be located in a secure facility such as a limited access area to provide physical security, and be operated in a stand alone configuration without provision for remote access to avoid remote hacker access. Physical security, however, cannot address remote access users so that a variety of software is used to establish varying authorization levels for remote system use and access. For example, remote users may be required to interface via a secure access or "firewall" system which requires a user to establish authorization to access a computer system prior to providing a connection. A firewall may further monitor use of facilities, limiting access and use according to the user's authorization. Software on the computer system itself further monitors access using, for example, passwords, personal identification numbers (pins), etc. to control access and use. Other software may be implemented to protect, for example, certain area of memory such as the operating system from being altered or overwritten. Some operating systems, for example, further limit write operations to particular areas of memory containing data used by a particular application and limit access to other areas of memory or alteration of instructions stored in memory. However, such software protections have often proved inadequate to stop a determined hacker from gaining unauthorized access and bypassing such safeguards. For example, a hacker might use another program to generate and try thousands or millions of access code combinations to break into a system. Alternatively, using a more conventional approach, a hacker might rummage through discarded company documents to obtain access code information, unlisted maintenance telephone numbers, etc. Access may also be obtained by "back doors" into the system otherwise used for maintenance, billing, and other non-remote access purposes. Hackers may also obtain access by implanting computer viruses into the system, often embedded in innocent appearing host software. Once implanted, the virus can damage the system directly or provide other methods of access for the hacker.

In addition to remote covert action, computer systems are also subject to local attacks by, for example, disgruntled employees, etc. On a less sinister basis, computer systems are further subject to unintentional damage by human operator error inadvertently deleting or modifying files and by program bugs in the system and applications having similar effects and results as that of intentional attacks on the system.

For the foregoing reasons, there exists a need for a secure computer system architecture and method for providing computer security which cannot be easily bypassed by innocent or surreptitious means, either remotely or local to the computer system. A further need exists for a computer system and method of operating a computer system which preserves data and program integrity while providing for remote access to users having only read access. A still further need exists for a computer system and method of operating a computer system which prevents data and instruction corruption, modification and deletion by improper operation of host applications or due to the intentional actions of software viruses and other rogue executable code.

SUMMARY OF THE INVENTION

The present invention is directed to a computer system and method of operating a computer system which provides enhanced data and program security. A system and method according to the invention limit access to computer system storage media by providing a locally operable switch which selectively prevents alteration to the local storage media. The switch may be a manually operable mechanical device or may be electronic, so long as its operation is isolated from the system being protected, and may be entirely self-contained. For example, the appropriate control lines between a hard disk controller and the hard disk drive are routed through a manually operable electrical switch which can only be manipulated locally and cannot be operated or bypassed under computer control. In one configuration, the appropriate write enabling conductor of the cable is physically interrupted by the mechanical switch when in a secure mode and, instead, the appropriate write disabling signal is applied to the hard disk drive. This basic configuration and method can be applied to various computer system architectures to support stand alone, multiuser and remote access capable computer systems.

According to another aspect of the invention, a computer system includes dual processor elements, one isolated from remote access and having facilities for writing information to a storage device. The other processor element, while handling communications with remote devices, is connected so as to positively inhibit writing or altering data contained in the storage device. To further protect system integrity, another aspect of the invention configures the communications processing element as a slave, receiving and executing instructions from the isolated processing element. The invention further divides data storing and retrieval functions between a pair of hard disk drives used to provide remote access. Using this division, remote users may read from one hard disk drive, but are incapable of altering the contents of the read only drive. Similarly, remote users can write to the other hard drive, but cannot read information stored by other users and cannot target information for alteration or destruction.

According to an aspect of the invention, a digital computer system includes a processor, a storage device and a manually operative switch. The storage device is responsive to the processor for selectively operating in a read mode of operation for reading previously stored data and in a write mode of operation for storing data. The manually operative switch selectively disables the processor from causing the storage device to operate in the write mode of operation. According to a feature of the invention, the manually operative switch is connected to interrupt the control signal required to cause the storage device to operate in the write mode of operation. The manually operative switch may be in direct electrical contact with the storage device and may be in the form of a mechanical switch or may be an electronic switch including control software and hardware components.

According to another feature of the invention, the processor includes a central processing unit, a controller which is in direct electrical contact with the manually operative switch, and a bus which connects the central processing unit and the controller.

According to another aspect of the invention, a digital computer system includes a storage device, first and second central processing units, and a first manually operative switch. The storage device is responsive to a control signal for selectively operating in a read mode of operation for reading previously stored data and in a write mode of operation for storing data. The first and second central processing units are each capable of providing this control signal. The switch then alternatively provides the control signal from either the first or second central processing unit to the storage device. According to a feature of the invention, the system further includes a second manually operative switch selectively disabling the storage device from operating in the write mode of operation.

According to another aspect of the invention, a digital computer system includes a processor, a secure data storage device and a manually operative switch. The secure data device is responsive to a write control signal from the data processor for selectively storing data. The switch is manually selectable to enable and disable receipt by the secure data storage device of the write control signal.

According to a feature of the invention, the manually operative switch selectively applies a predetermined fixed control signal to the secure data storage device instead of the write control signal. The secure data device may be a nonvolatile memory including a hard disk drive.

According to another feature of the invention, a bus connects the processor to the secure storage device for transmission of the control signal so that the manually operative switch selectively enables and disables a transmission of the control signal along the bus.

According to another feature of the invention, the processor includes a central processing unit and a disk controller connected to each other by a system bus. The secure data device includes a disk drive electrically connected through the manually operative switch to the disk controller for receiving the control signal so that the manually operative switch selectively enables and disables transmission of the control signal. Another disk drive may be included together with another disk controller connected to the system bus for selectively writing data to and reading data from the additional disk drive in the form of, for example, an array of multiple hard disk drives (e.g., redundant array of independent disks, or "RAID"). These additional disk drives may be connected independent of the manually operative switch or may be connected with a second manually operative switch to prevent writing to the additional disks.

According to another feature of the invention, the digital computer system further includes first and second disk controllers connected to respective master and slave central processing units by a system bus. The secure data storage device includes a first disk drive electrically connected through the manually operative switch to the first disk controller for receiving a control signal from the master central processing unit whereby the manually operative switch selectively enables and disables transmission of the control signal to the first disk drive. The second disk drive is connected to the second disk controller and is accessible by the master and slave central processing units over the system bus. Alternatively, the first and second disk controllers may be included on separate buses accessible only by the respective master and slave central processing units.

According to another feature of the invention, a second manually operative switch is interposed between the second disk drive and the second disk controller to selectively disable reading from or, in an alternate configuration, writing to the second disk drive.

According to another feature in the invention, the computer includes a third disk controller and disk drive with the disk drive operative to mirror data stored in the second disk drive.

According to another feature in the invention, the computer system includes a first program memory connected to and storing instructions executable by the master central processing unit. A second program memory is connected to and stores instructions executable by the slave processing unit with a processor bus connecting the master and slave central processing units. A communications controller may be connected to the system bus to provide for remote access.

According to another aspect of the invention, a computer system includes a processor, a manual switch and a data storage device. The switch is connected to selectively transmit a control signal received from the processor and, alternatively, a write inhibiting control signal. In response to the signal received from the switch, the data storage device selectively stores data or is inhibited from doing so.

According to a feature of the invention, the storage device is responsive to the control signal transmitted by the manual switch for selectively operating in read and write modes of operation so that the write-inhibiting control signal causes the data storage device to operate only in the read mode of operation and/or other modes protecting the integrity of the data (e.g., internal refresh only).

According to another feature of the invention, the processor includes a first disk controller and the data storage device is a first disk drive. According to another feature of the invention, a second disk drive may also be connected to the first disk controller or may be connected to its own, second disk controller.

According to another aspect of the invention a digital computer system includes a processor, a storage device and a switch. The storage device is responsive to the processor for selectively operating in a plurality of operating modes including a read mode of operation for retrieving previously stored data and a write mode of operation for storing data. The switch is operable to selectively enable and disable at least one of the operating modes, the switch being controllable by means distinct and separate from the processor so that the processor is inhibited from controlling the operation of the switch. According to a feature of the invention, the switch may be manually operated to selectively make and break an electrical conducting path connecting the processor with the storage device.

Alternatively, the switch may include a controller, an operation of which is independent of the processor for selectively enabling and disabling at least one of the operating modes. At least one of the operating modes may be a read mode of operation and, alternatively, may be a write mode of operation. According to a feature of the invention, a second "master" processor is isolated from the first processor and both (i) controls the switch and (ii) reads and writes to the storage device.

According to another feature of the invention, the storage device may include a magnetic media and comprise a disk drive or a magnetic tape. The storage device may alternatively include a non-volatile electronic memory device, such as an EEPROM.

According to still a further feature, the storage device may include an optical storage device such as a CD-ROM or an electro-optical source device such as a CD-RW.

According to still another feature of the invention, the digital computer includes a processor with a first memory storing program instructions and a distinct and separate memory storing data. The first memory may be operable in the read only mode of operation in which the program instructions are protected from alteration and erasure by the central processing unit.

According to another aspect of the invention, a method of operating a digital computer system includes the steps of supplying a variable control signal to a disk drive and writing data to the disk drive in response to the variable control signal. A manual electrical switch is operated so as to disconnect the variable control signal from the disk drive and instead, connect a fixed control signal to the disk drive. The disk drive is then operated in a mode other than a write mode of operation in response to the fixed control signal. According to a feature of the method, remote access to the disk drive is provided only when operating in the mode other than the write mode of operation, i.e., in the secure mode inhibiting changes to the hard disk drive.

These and other features, aspects and advantages of the present invention will become better understood with regard to the following description, claims and accompanying drawings.

BRIEF DESCRIPTION OF THE DRAWINGS

FIG. 2 is a block diagram of a computer system according to the invention including a switch for inhibiting a hard disk drive from operating in a write mode of operation and segmented main memory.

FIG. 3 is a pin-out diagram and table for an IDE connector.

DETAILED DESCRIPTION OF THE PREFERRED EMBODIMENT

Figure 1:
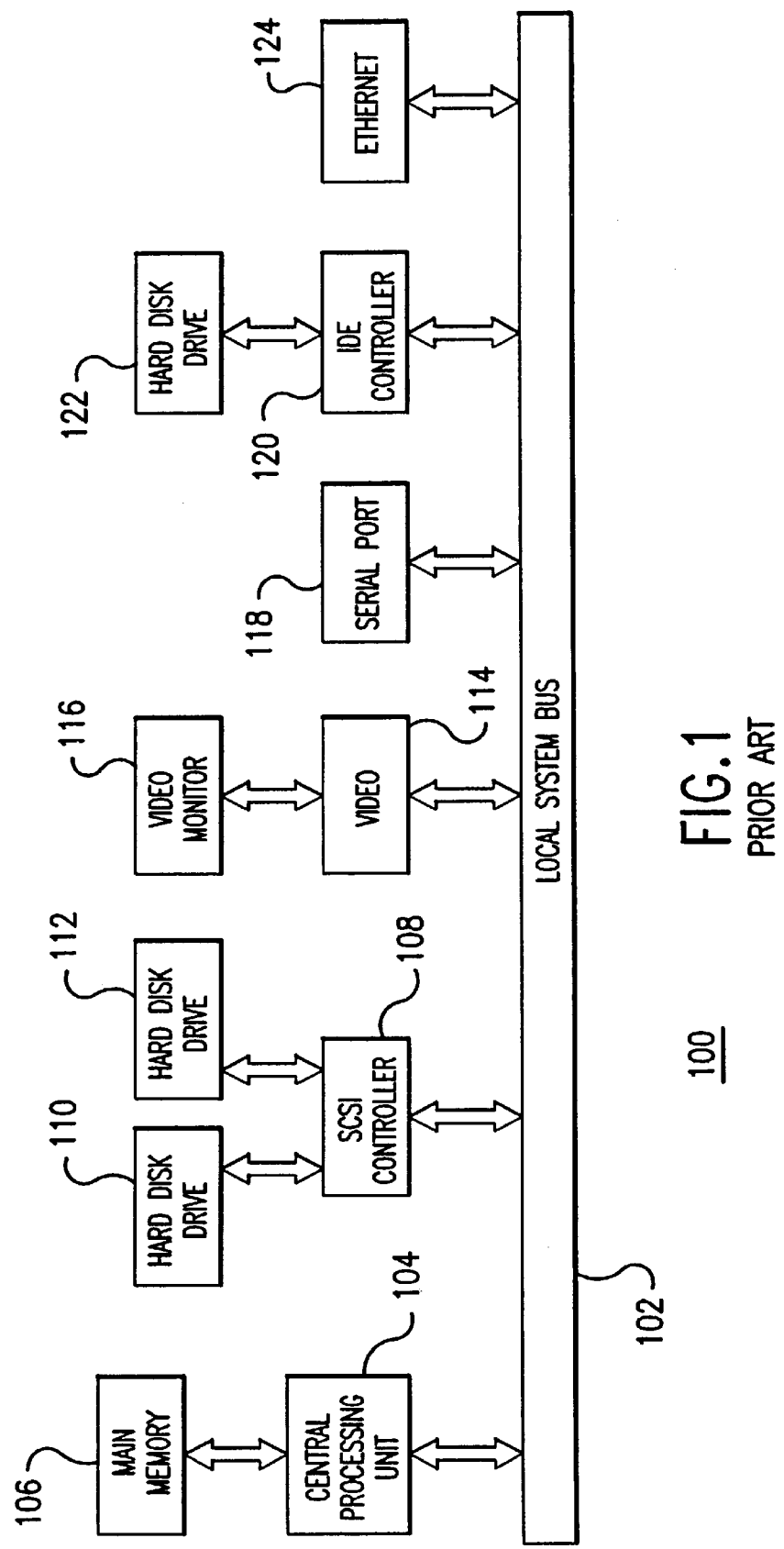
FIG. 1 is a block diagram of a computer system according to the prior art.

Referring to FIG. 2 of the drawings, a computer system 200 includes conventional devices 102–124 as discussed in connection with the prior art with the (i) addition of switch 202 interposed between SCSI controller 108 and hard disk drive 110 and (ii) partitioning of main memory into separate instruction memory 106a and data memory 106b. Instruction memory 106a may include various forms and levels of protection. For example, instruction memory 106a may be implemented in the form of an EEPROM with a manual erase and programming feature. Thus, CPU 104 would have read-only access to instruction memory 106a unless and until the associated EEPROM was manually provided with the proper control signals to allow its programming. This feature prevents unauthorized modification of programming and provides security against viruses attacking the program code. In contrast, data memory 106b is a conventional RAM for the temporary storage of data, including system and application program parameters and variables.

Switch 202 may be configured as a part of SCSI controller 108, hard disk drive 110, or as a separate auxiliary device. Switch 202 may be exclusively manually operable to inhibit a hard disk drive from altering or erasing data. Alternatively, switch 202 may be an electronic switch controlled by a control signal physically inaccessible to or by CPU 104. Typically, hard disk drive 110 is responsive to read and write requests from SCSI controller 108. Switch 202 is effective to selectively inhibit operation in the write (or read) mode so that, effectively, hard disk drive 110 can be operated in either a read/write mode, or in a read only or write only mode of operation.

If switch 202 is included as part of SCSI controller 108, then it is connected to inhibit write requests from CPU 104 (or other devices) from being sent to hard drive 110. If switch 202 is instead incorporated into hard drive 110, it can be connected to inhibit operation of hardware used to operate the disk drive's write heads. For example, the switch 202 can be configured to cut power to a write head's output circuitry. Preferably, hard disk drive 110 and/or SCSI controller 108 provide the appropriate status and/or error messages to CPU 104 when operating in a write inhibited or read only mode of operation or when a write operation is requested and the write mode has been disabled.

Switch 202 may also be configured as an auxiliary, stand alone device mounted in a switch box enclosure with appropriate terminals for connecting controller 108 to hard disk drive 110. In this configuration, switch 202 is operative in a first read/write position to pass signals from controller 108 to hard disk drive 110 without change. In a write inhibit or read only mode of operation, switch 202 will not pass signals from controller 108 to hard disk drive 110 which would cause hard disk drive 110 to be placed in a write mode of operation. For example, pin 50 of a SCSI interface may be set to the appropriate logic level when a selected device is accessed so as to limit operation of the selected device to either a read or write mode as appropriate. Alternatively, switch 202 may be connected between IDE controller 120 an hard disk drive 122 to selectively restrict access and control of the latter. Using an IDE interface, a pin-out diagram for which is shown in FIG. 3 of the drawings, write strobes from the controller are transmitted to the hard drive on pin 23. That is, the controller signals the hard drive that data supplied on pins 3–18 is ready to be written by driving a control signal applied at pin 23 to a "low" logic level. Thus, in a secure mode of operation wherein writing to a hard drive is to be inhibited, pin 23 is connected to a high level logic signal source so that the hard disk drive does not receive the write strobe signal necessary to cause it to perform a write operation.

Alternatively, switch 202 may include appropriate hardware and software to monitor signals transmitted by controller 108 to hard disk drive 110. Write (or other inhibited actions such as read, erase, etc.) commands to one or more designated devices would be recognized and intercepted, switch 202 generating an appropriate error message back to controller 108. Permissible operations would be transmitted through to disk drive 110 without impediment. In this software implementation of switch 202, predetermined portions of disk drive 202 may be designated as secure so that write commands are selectively inhibited only to designated tracks, sectors, clusters, etc.

Figure 4A:
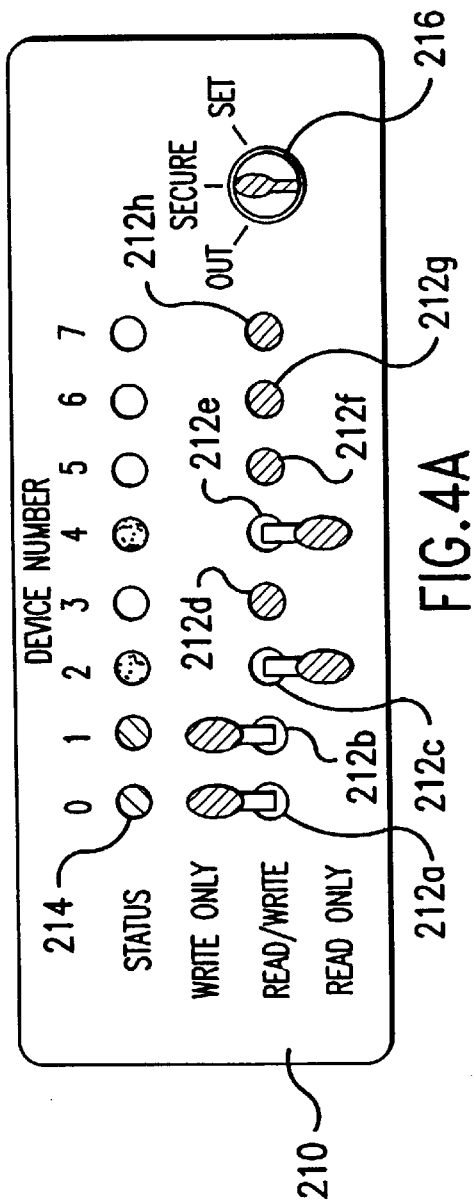
FIGS. 4a and 4b are front and rear views of a stand alone switch device for insertion between a SCSI controller and one or more SCSI devices.
Figure 4B:
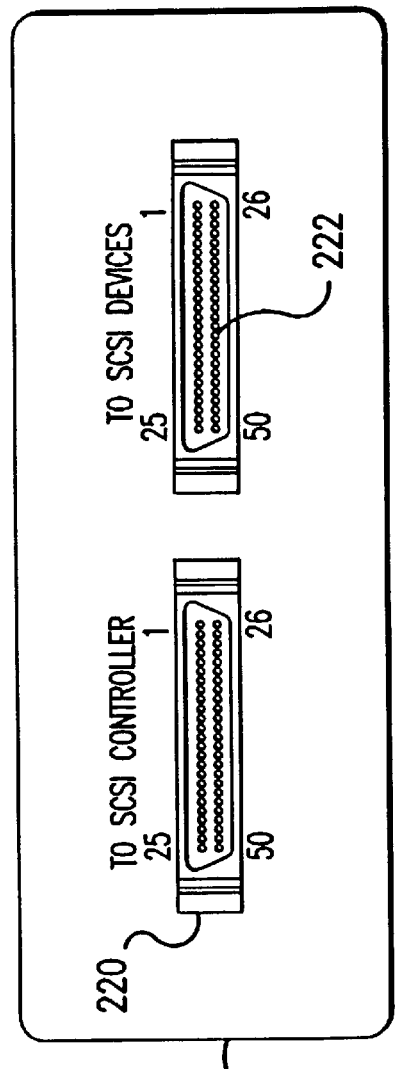

FIGS. 4a and 4b show a stand alone, programmable embodiment of switch 202 which can accommodate eight peripheral devices on a SCSI interface. Switch 202 is mounted in enclosure 210 and includes panel mounted programming switches 212a–212h associated with respective SCSI devices 0–7. Each of the programming switches is selectable to designate a read only, read/write, or write only mode of operation for the respective device. Once programmed, the status of each device is indicated by a tricolor LED 214 associated with each switch, green, for example, indicating read/write capabilities, yellow that the corresponding device can be operated in a read only mode of operation (write-inhibited), and red indicating that the corresponding device is operable in a write only mode of operation (i.e., read operations are inhibited). As shown in FIG. 4a, devices 0 and 1 are being operated in write only modes (i.e., a "secure" mode), devices 2 and 4 in read only modes (another "secure" mode), and devices 3, 5, 6, and 7 in read/write modes (i.e., are not being operated as "secure" devices).

A key switch 216 may be included to control the operation of switch 202. In the "OUT" mode, the switch is functionally inoperative so that the operations of all devices are unrestricted as would be indicated by green status lights 214. In the "SECURE" mode, the programmed mode limits would be effective to limit read and write modes of operations. The "SET" mode is used to program switch 202 according to switches 212a–212h. A corresponding key (not shown) is removable from key switch 216 in the "OUT" and "SECURE" positions so that switch 202 can be left locked and unattended. Preferably, the "SET" position of key switch 216 is a temporary position with a spring returned to the "SECURE" position upon completion of programming. When switch 216 is in the "SET" mode, the position of switches 212a–212h are read and the corresponding mode limitations are stored in memory as would be indicated by status indicators 214.

A rear view of switch 202 is presented in FIG. 4b including panel mounted SCSI connectors 220 and 222 for connecting the switch to a SCSI controller and to SCSI devices being controlled, respectively.

Figure 5:
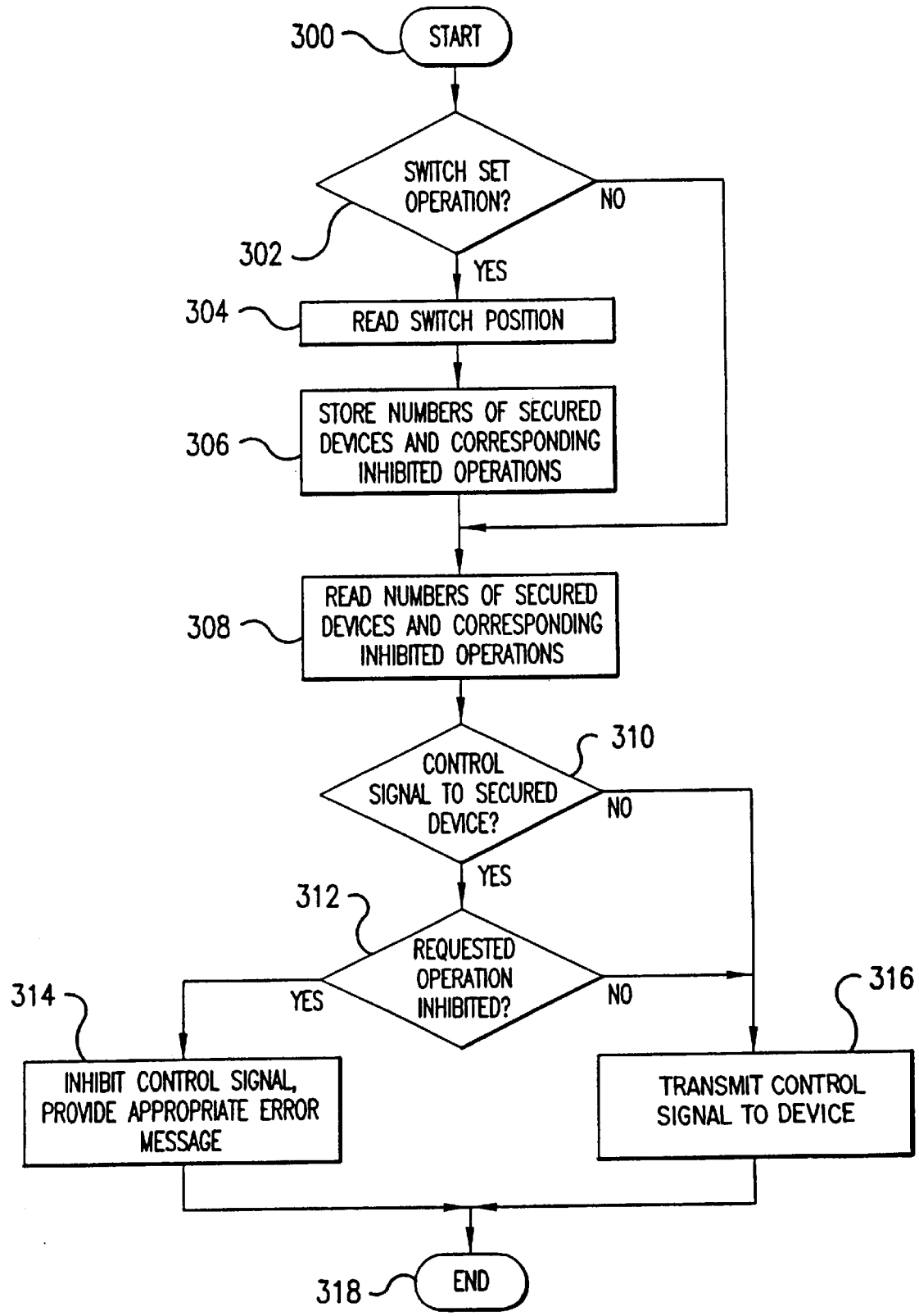
FIG. 5 is a flow diagram for a software implemented switch for restricting operation of designated peripheral devices to programmed modes of operation.

The operation of switch 202 is shown in the flow diagram of FIG. 5. The program starts at entry point 300 with an initial decision box 302 handling the set mode of operation for programming the device. If switch 202 is in the "SET" mode, then the positions of switches 212a–212h are read at process 304 and the corresponding limitations are stored in memory at process 306. If the SET operation has not been activated, or upon completion of the programming, processing continues at step 308 where the numbers of the secure devices are read from memory together with the corresponding allowed modes or inhibited modes of operations, as appropriate. In response to receipt of a control signal at decision 310, the program decides if the control signal is directed to a secure device, i.e., a device number previously stored as being operated in a "SECURE" mode with either read or write operations inhibited. If the control signal is directed to a device which is not subject to read or write limitations, such as devices 3, 5, 6, and 7 according to FIG. 4a, then the control signal is transmitted to that device at process 316. However, if the control signal is directed to a device which is being operated in a secure mode of operation (devices 0, 1, 2, and 4 in this example), then the process determines at decision box 312 if the requested operation has been inhibited. For example, device numbers 0 and 1 are being operated in a read-inhibited mode while devices 2 and 4 are being operated in a write-inhibited mode. Accordingly, read requests directed to devices 0 or 1 and write requests directed to devices 2 and 4 would result in the left branch being taken out of decision point 312 where the appropriate control signal would be inhibited and an error message generated back to the requesting controller. Conversely, if the operation requested has not been inhibited, the right branch is taken out of decision box 312 and the request is transmitted to the device address. In either case, process flow continues down to terminal 318. At this point, the process would conventionally loop back to Start 300 to continuously detect and process programming requests and SCSI interface commands.

Figure 6:
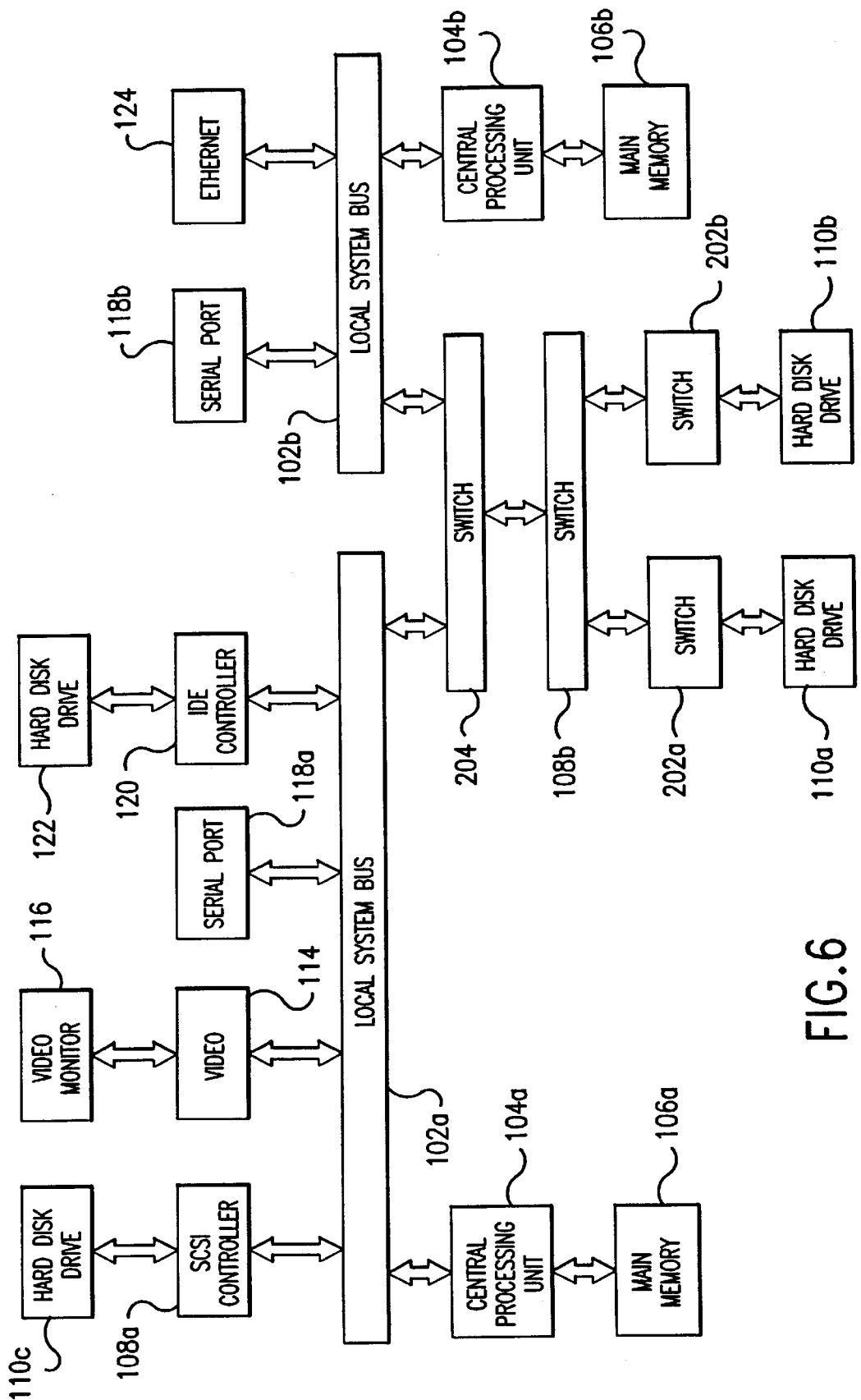
FIG. 6 is a block diagram of a computer system according to another embodiment of the invention including a switch for connecting a storage unit to a stand alone processing unit or to a processor providing for remote access.

Another embodiment of the invention is shown in FIG. 6 depicting a dual processor system, with both read/write and read only hard drives, each having a dedicated bus, local memory and storage. A hard drive storage system is switchable between the processors. The hard drive storage system includes two disk drives, operable in a non-secure normal mode of operation in which both drives are read/write enabled, and in a protected mode wherein one drive is operated in a read only mode and the other in a write only mode of operation. In this configuration, the two processors are isolated from each other, one of the processors providing for local system operation, the other providing remote access to the mass storage devices including hard disk drives. In effect, the system is equivalent to two separate independent systems on one motherboard when configured as a personal computer (PC). Both systems require software to be loaded, and some system configuration to be performed. Communications between the processors is provided by the common hard drive storage system.

Operator monitoring of the system performance and downloading of data acquired by the system is performed by a primary CPU 104a connected to a first local system bus 102a. The second local data bus 102b supports a communications CPU 104b. Connected to both buses 102a and 102b, switch 204 physically switches SCSI controller 108b between the two buses. Hard disk drives 110a and 110b are connected and controlled by SCSI controller 108b through write mode disabling switch 202a and read mode disability switch 202b, respectively. Switchable SCSI controller 108b would be switched to main local system bus 102a for loading and configuration of software under control of main CPU 104a. After loading and testing of software, SCSI controller 108b would be switched to local system bus 102b supporting communications with remote users over serial port 118b and Ethernet 124. Hard disk drive 110a would be then operated in a read only mode of operation by switch 202a. Conversely, hard disk drive 110b would be operated in a "write only" mode of operation so that, for example, any uploaded data could be checked for viruses prior to that data becoming available to the system. Further, by placing hard disk drive 110b in a "write only" mode of operation using switch 202b, data uploaded to the drive by remote users of the system cannot be accessed by other remote users thereby enhancing system security. This feature is particularly useful for e-commerce applications where confidential data received from remote user must be protected from unauthorized dissemination (e.g., credit card information, etc.).

In the configuration of FIG. 6, the primary CPU 104a and associated first bus 102a are inaccessible to remote users. Accordingly, switch 204 and switches 202a and 202b may be electronically controlled by primary CPU 104a without jeopardizing the security of the system. This feature is incorporated into the configuration shown in FIG. 7 wherein SCSI controllers 108c and 108d are connected to respective first and second buses 102a and 102b. Switch 206 is controlled by CPU 104a via serial port 118b connected to first bus 102a. Switch 206 selectively connects either SCSI controller 108c or 108d to SCSI hard disk drives 110a and 110b.

In a local mode of operation, switch 206 provides unlimited access by local SCSI controller 108c to hard disk drives 110a and 110b. Thus, CPU 104a can both read from and write to the drives. Upon being commanded to connect the drives to second bus 102b to support remote access, switch 206 disconnects SCSI controller 108c and connects SCSI controller 108d to the drives subject to preprogrammed operating mode limitations. For example, when being accessed by SCSI controller 108d, hard disk drive 110a may be write inhibited while hard disk drive 110b may be read inhibited as described in connection with the configuration of FIG. 6.

Figure 7:
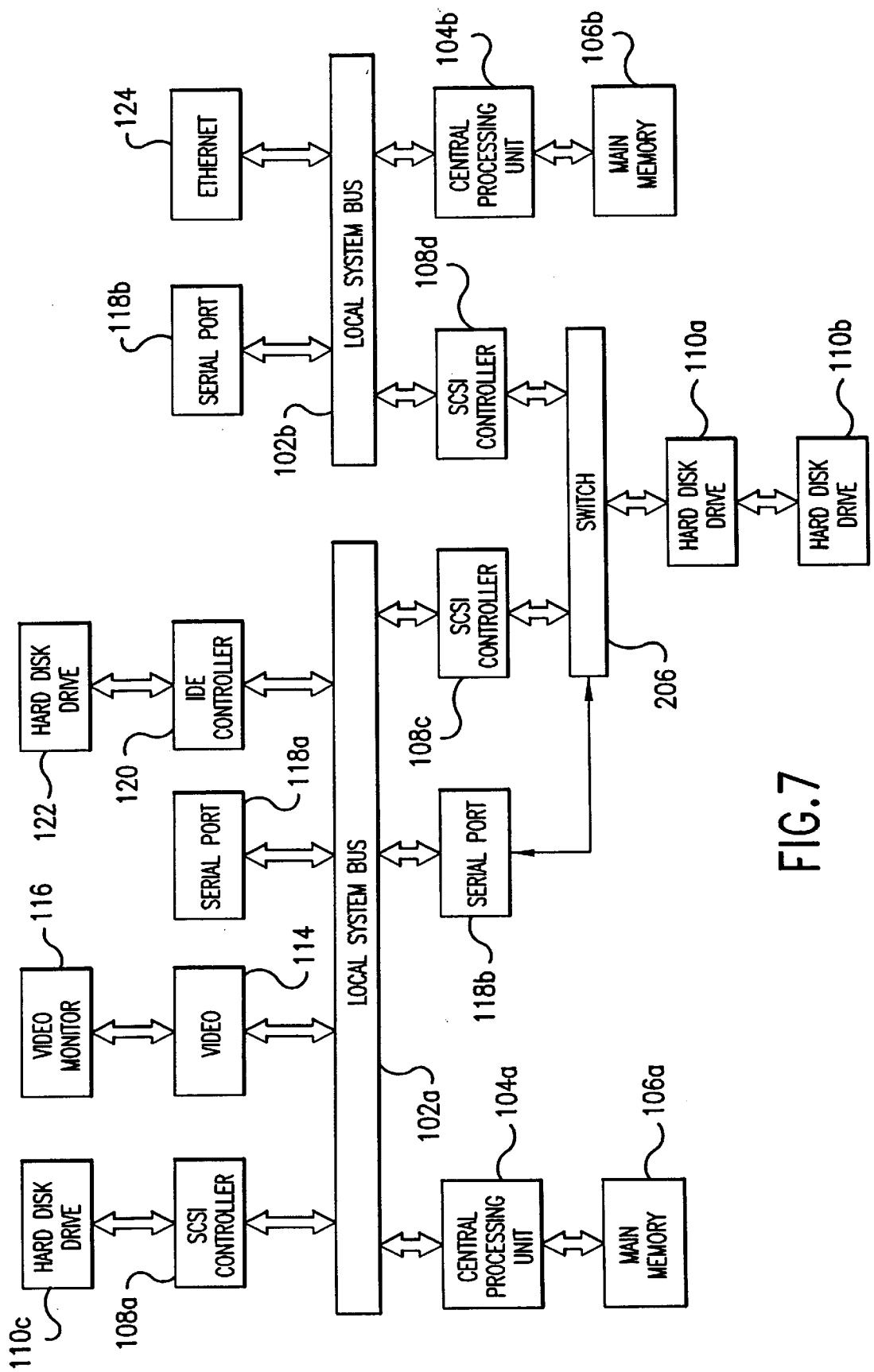
FIG. 7 is a block diagram of a computer system according to another embodiment including isolated (i) secure local and (ii) remote processing systems sharing common hard disk facilities under the exclusive control of the secure local processor.
Figure 8A:
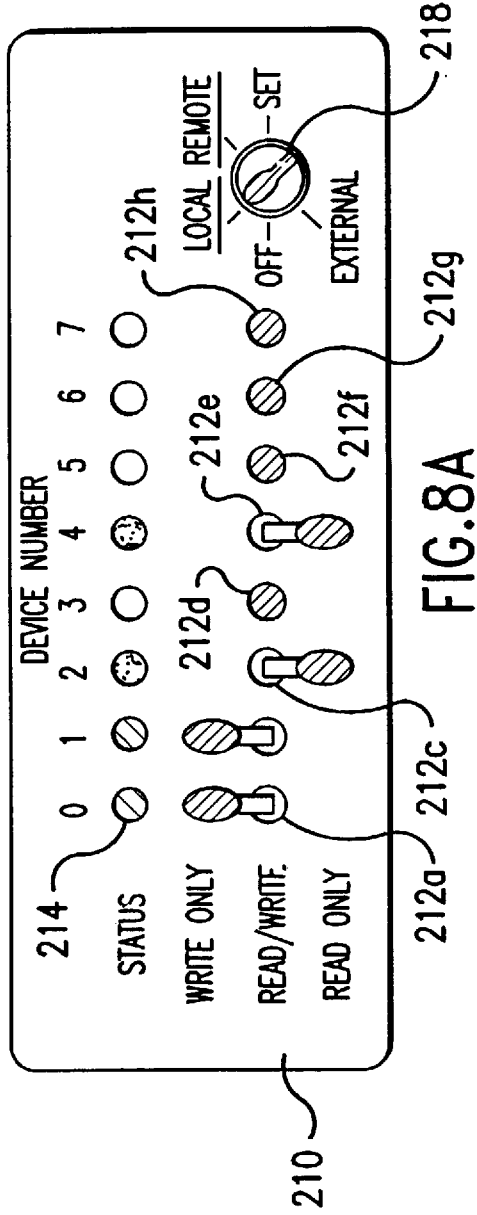
FIGS. 8a and 8b are front and rear views of a switching device for selectively connecting one of two SCSI controllers to a plurality of SCSI devices and for limiting operation of those SCSI devices to programmed modes of operation when connected to the second of the SCSI controllers.
Figure 8B:
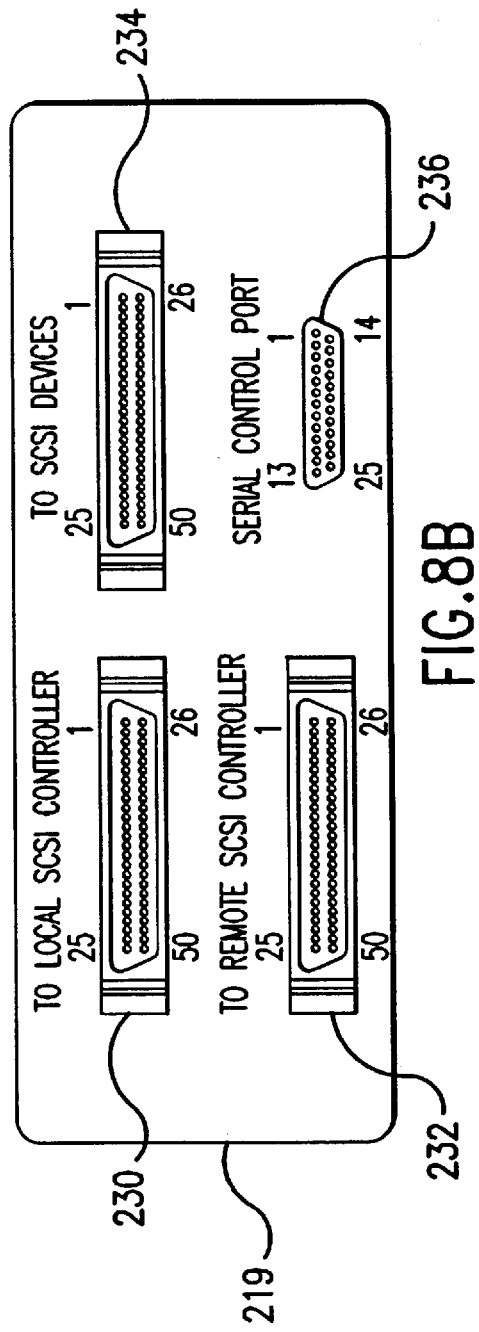

FIGS. 8a and 8b show an alternate implementation of a stand alone switch 210 suited to the dual processor system shown in FIG. 7. The output of SCSI controller 108c, which is connected to local system bus 102a, is provided to connector 230 while SCSI controller 108d, which is connected to local system bus 102b, is connected to connector 232. A serial connector 236 provides an interface for optional computer control of the switch.

In this configuration, switch 210 both switches hard disk drives 110a and 110b between the appropriate SCSI controller and selectively operates the hard disk drives in the pre-programmed restricted modes of operation. As shown, key switch 218 has five positions including "EXTERNAL", "OFF", "LOCAL", "REMOTE", and "SET". In the "OFF" mode, neither of the SCSI controllers have access to peripheral devices including the hard disk drives. In the "LOCAL" position, signals from and to connector 230 are passed through without alteration to SCSI devices connected to connector 234. This mode is applicable to unrestricted operation of the peripheral devices when under control of primary CPU 104a which is inaccessible by remote users.

When key switch 218 is placed in the "REMOTE" position, connector 232 provides access to SCSI devices connected at connector 234 under the control and supervision of switch 210 to selectively inhibit predetermined modes of operation according to stored programming and as indicated by status indicator lights 214. As previously described, a temporary, spring loaded "SET" position is provided for programming switch 210 according to the positions of switches 212a–212h.

The "EXTERNAL" position allows a secure device, such as primary CPU 104a, to program and control switch 204 via a serial RS-232 interface. Thus, so long as the security of primary CPU 104a is not breached, the operating integrity of switch 202 is maintained.

Figure 9:
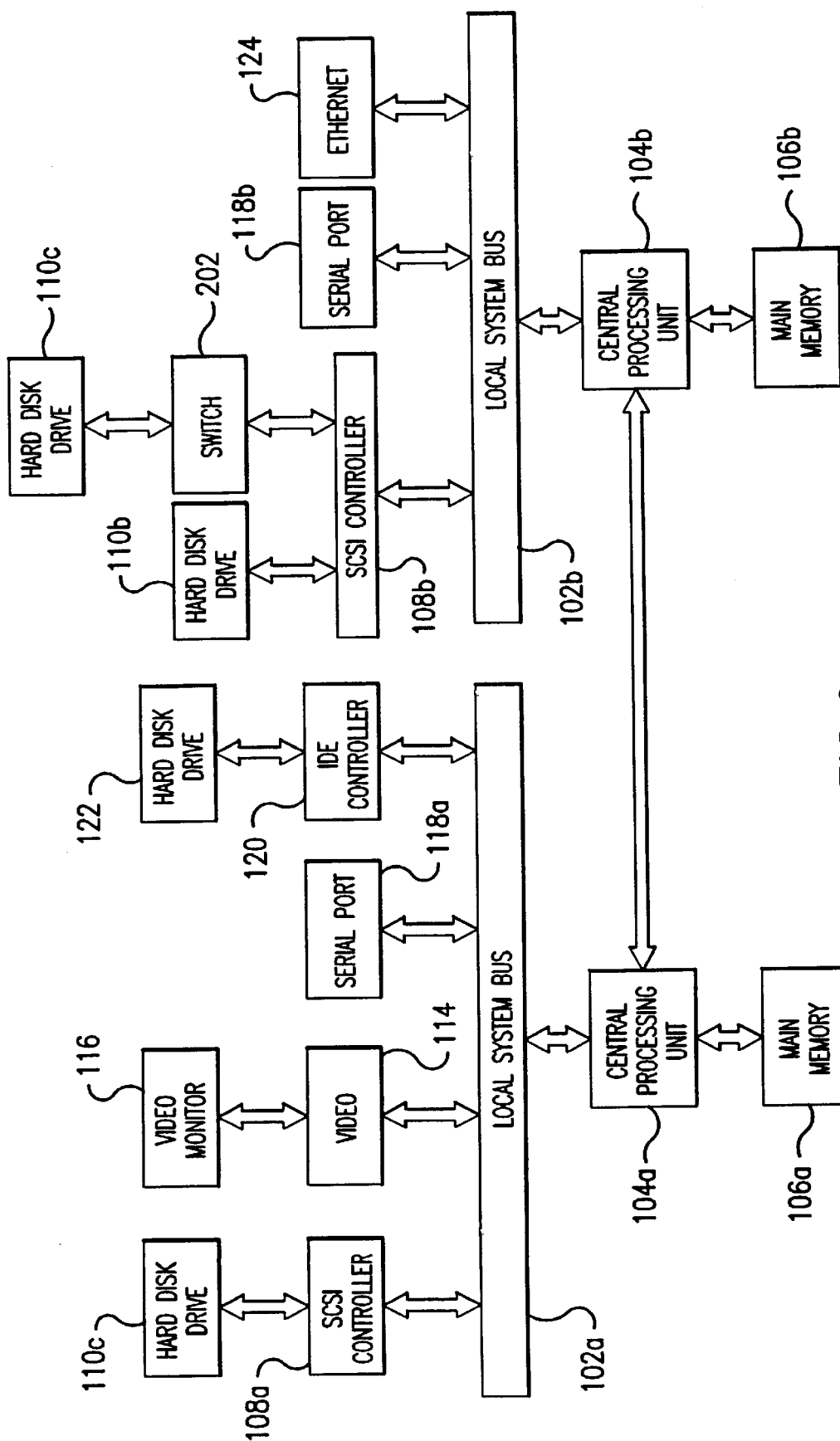
FIG. 9 is a block diagram of a computer system according to the invention including a master/slave architecture.

Another embodiment in the invention including dual processors in a master/slave relationship is shown in the block diagram of FIG. 9. According to this embodiment, one processor manages communications including, for example, responding to requests from the Internet. However, the slave processor only accepts program instructions from the primary processor. This can be accomplished by appropriate programming of the system firmware (e.g., BIOS) of the slave processor. Thus, the slave processor is controlled only by the master processor and would not be accessible by a remote computer hacker.

Referring to FIG. 9, a master central processing unit 104a is connected to dedicated main memory 106a including an operating system. Master central processing unit 104a is connected via local system bus 102a to various devices including (1) hard disk drive 110a through SCSI controller 108a; (2) video control board 114 and video monitor 116; (3) serial port 118a; and (4) hard disk drive 122 through IDE controller 120. Slave central processing unit 104b provides remote access functions and is connected to a local main memory 106b. Central processing unit 104b connects to SCSI controller 108b, serial port 118b and Ethernet 124 through local system bus 102b. In turn, SCSI controller 108b connects to hard disk drive 110b and, via selectable "read only" switch 202, to hard disk drive 110c. As previously mentioned, slave central processing unit 104b obtains operating instructions exclusively from master central processing unit 104a so that viruses or other changes cannot be remotely made to its operating instructions or programming. Critical data that is to be protected from change or deletion by remote users is stored in hard disk drive 110c operated in a read only mode of operation. Hard disk drive 110b supports storage of data by remote users, such as required for e-commerce, etc.

According to the invention as illustrated by the embodiments described, the capability of writing to and altering data is disabled for remote users by disabling hard disk write capabilities, limiting remote user access to a dedicated and segregated data processor and associated bus and data storage, and by isolating control of a communications processor so that instructions are only executed as received from a secured master processor. The invention further enhances security by segregating read and write functions to different hard drives so that remote users cannot alter information previously stored on the system nor can they read information stored by other remote users.

Although the present invention has been described in considerable detail with reference to certain preferred embodiments thereof, other embodiments or configurations are possible. For example, the mode limiting switch is applicable to other storage devices and media and to other devices where selection and control of operating modes must be restricted. For example, a restricted user may be limited by the switch to monitoring the output of a device such as a video camera, while a local user may additionally control the camera. Similarly, the switch may be used in-line with a printer to allow limited printing capabilities for certain users while providing full capabilities to local users of the system. Accordingly, the spirit and scope of the appended claims should not be limited to the description of the preferred embodiments contained herein.

What is claimed is:

1. A digital computer system comprising:

first and second electrically isolated buses;

first and second independent central processing units connected to a respective one of said first and second buses;

a storage device connected to each of said buses for selectively storing data; and a manually operative switch selectively controlling access by said first central processing unit to inhibit storing data to said storage device by said first central processing unit without inhibiting storing data by said second central processing unit.

2. The digital computer system according to claim 1 wherein said storage device is operable in (i) a read mode of operation for reading previously stored data and (ii) a write mode of operation for storing said data.

3. The digital computer system according to claim 2 wherein said manually operative switch is connected to both said first and second buses to selectively operate said storage device in a write-only protected mode of operation.

4. The digital computer system according to claim 1 further comprising an interprocessor bus, said first central processing unit comprising a master central processing unit and said second central processing unit comprising a slave central processing unit, said master and slave central processing units connected to each other by said interprocessor bus and connecting to respective ones of said first and second buses, said manually operative switch connected to both said first and second buses and connected to selectively transmit to said storage device a control signal requited to cause said storage device to operate in said write mode of operation.

5. A digital computer system comprising:

first and second independent local buses;

first and second storage devices, each responsive to a control signal for selectively operating in (i) a read mode of operation for reading previously stored data and (ii) a write mode of operation for storing data;

first and second central processing units respectively connected to said first and second local buses, each of said first and second central processing units capable of providing said control signal;

a first manually operative switch alternatively providing said control signals from said first and second local buses to said first and second storage devices, said switch further configured to selectively operate said first and second storage devices in a protected mode of operation, said protected mode of operation including at least one of a write-only and read-only mode of operation.

6. The digital computer system according to claim 5 further comprising a second manually operative switch selectively disabling at least one of said first and second storage devices from operating in said write mode of operation.

7. The digital computer system according to claim 5 farther comprising second and third switches, said second switch selectively inhibiting said first storage device from operating in said write mode of operation, said third switch selectively inhibiting said second storage device from operating in said read mode of operation.

8. The digital computer system according to claim 7 further comprising a communications interface providing remote access to said second local bus.

9. The digital computer system according to claim 5 further comprising switching means having a first state wherein said first and second storage devices are operable in both said read and write modes of operation and a second state inhibiting operation of said first storage device in said write mode and of said second storage device in said read mode.

10. The digital computer system according to claim 9 further comprising a communications interface providing remote access to said second central processing unit.

11. The digital computer system according to claim 5 further comprising switching means having a first state wherein said first and second disk storage devices are operable in both said read and write modes and a second state causing said first storage device to be operated only in said read mode of operation and said second storage device only in said write mode of operation.

12. The digital computer system according to claim 11 further comprising a communications interface providing remote access to said second central processing unit.

13. A digital computer system comprising:

first and second system buses electrically independent of each other;

master and slave central processing units connected to respective ones of said system buses;

first and second controllers respectively connected to said master and slave central processing units by respective ones of said system buses;

a data storage device responsive to a write control signal from one of said master and slave processing units on a respective one of said first and second system buses for selectively storing data said data storage device including first and second storage devices; and a manually operative switch selectively enabling and disabling receipt by said data storage device of said write control signal from said first and second system buses.

14. The digital computer system according to claim 13 wherein said manually operative switch selectively connects said data storage device to one of said first and second controllers.

15. The digital computer system according to claim 13 wherein said manually operative switch is operative to selectively cause said data storage device to operate in a protected mode including a read-only and a write-only mode of operation independent of a mode control signal provided by one of said master and slave central processing units.

16. The digital computer system according to claim 13 wherein said manually operative switch is operative to selectively cause said data storage device to operate in a data protected mode including one of a read-only and write-only mode of operation independent of a mode control signal provided by one of said master and slave central processing units.

17. The digital computer system according to claim 13 further comprising a bus connecting one of said master and slave central processing units to said data storage device for transmission of said control signal wherein said manually operative switch selectively enables and disables a transmission of said control signal along one of said first and second buses.

18. The digital computer system according to claim 17 wherein said data storage device comprises a hard disk drive.

19. A digital computer system comprising:

a first data processing unit including a first central processing unit and a first disk controller connected to each other by a first system bus;

a second data processing unit including a second central processing unit and a second disk controller connected to each other by a second system bus, said second system bus electrically independent of said first system bus;

a secure data storage device responsive to a write control signal from each of said first and second data processing units for selectively storing data, said secure data storage device comprising a first disk drive; and a manually operative switch selectively enabling and disabling receipt by said secure data storage device of said write control signal.

20. The digital computer system according to claim 19 wherein said first disk drive comprises an array of hard disk drives.

21. The digital computer system according to claim 19 further comprising another disk drive connected to one of said first and second disk controllers independent of said manually operative switch.

22. The digital computer system according to claim 19 wherein said first disk drive is electrically connected through said manually operative switch to said first disk controller for receiving said control signal whereby said manually operative switch selectively enables and disables a transmission of said control signal, said digital computer system further comprising a second disk drive; and a second disk controller connected to said second system bus and to said second disk drive for selectively writing data to and reading data from said second disk drive.

23. A digital computer system comprising:

master and slave central processing units;

master and slave system buses electrically isolated from each other and respectively connected to said master and slave central processing units;

a secure data storage device responsive to a write control signal from each said master and slave central processing units for selectively storing data;

a manually operative switch configured to selectively enable and disable receipt by said secure data storage device of said write control signal so as to selectively operate said secure data storage device in a read-only mode of operation; and first and second disk controllers connected to said master and slave system buses, said secure data storage device including a first disk drive electrically connected through said manually operative switch to said first and second disk controllers for receiving said write control signal from one of said master and slave central processing units whereby said manually operative switch selectively enables and disables transmission of said write control signal.

24. The digital computer system according to claim 23 further comprising a second disk drive connected to said second disk controller.

25. The digital computer system according to claim 23 further comprising:

a first program memory connected to and stoning instructions executable by said master central processing unit, a second program memory connected to and storing instructions executable by said slave central processing unit, and a processor bus connecting said master and slave central processing units.

26. The digital computer system according to claim 23 further comprising a communications controller connected to said slave system bus.

27. A digital computer system comprising:

a first central processing unit;

a first system bus connected to said first central processing unit;

a second central processing unit;

a second bus connected to said second central processing unit and centrically isolated from said first system bus;

a disk controller;

a first manual switch selectively providing a conductive path between said disk controller and, in a first position, said first system bus and, in a second position, said second system bus; and a hard disk drive connected to said disk controller and responsive to a write control signal from said disk controller for selectively storing information.

28. The digital computer system according to claim 27 further comprising a second manual switch interposed between said disk controller and said hard disk drive for selectively transmitting said write control signal therebetween so as to selectively permit an operation of said hard drive in a read-only mode of operation.

29. A digital computer system comprising:

a first system bus;

a second system bus a first processor connected to said first system bus;

a second processor connected to said second system bus;

a data storage device connected to said first and second system buses for selectively operating in a plurality of operating modes so as to access said data storage device; and a switch operable to selectively enable and disable at least one of said operating modes, said switch controllable by means distinct and separate from at least one of said processors whereby said one processor is inhibited from controlling said operation of said switch.

30. The digital computer system according to claim 29 wherein said switch comprises a manually operated switch connected to selectively make and break an electrically conducting path connecting of said first and second system base one processor and said data storage device.

31. The digital computer system according to claim 29 wherein said switch comprises a digital controller, an operation of which is independent of said second processor for selectively enabling and disabling said at least one of said operating modes.

32. The digital computer system according to claim 29 wherein said data storage device is operable in (i) a read-only mode of operation for retrieving previously stored data and (ii) a write-only mode of operation for storing data.

33. The digital computer system according to claim 32 wherein said at least one of said operating modes is said read-only mode of operation.

34. The digital computer system according to claim 32 wherein said at least one of said operating modes is said write-only mode of operation.

35. The digital computer according to claim 32 wherein said data storage device comprises a magnetic media.

36. The digital computer according to claim 32 wherein said data storage device comprises a disk drive.

37. The digital computer according to claim 32 wherein said data storage device comprises a magnetic tape.

38. The digital computer according to claim 32 wherein said data storage device comprises a non-volatile electronic memory device.

39. The digital computer according to claim 38 wherein said electronic non-volatile electronic memory device comprises an EEPROM.

40. The digital computer according to claim 32 wherein said data storage device comprises an optical storage device.

41. The digital computer according to claim 32 wherein said data storage device comprises an electro-optical storage device.

42. The digital computer according to claim 32 wherein each of said first and second processors include a central processing unit, a first memory storing program instructions and a second memory, separate and distinct from said first memory, storing data.

43. The digital computer according to claim 33 wherein at least one of said first memories is operable in a read-only mode of operation in which said program instructions are protected from alteration and erasure by a corresponding one of said central processing units.

44. A method of accessing a digital storage device using a digital computer system, the digital computer system including first and second independent local buses, first and second central processing units respectively connected to said first and second local buses, and a manually operative switch, the method comprising the steps of:

transmitting control signals from said first and second central processing units to respective ones of said fist and second local buses;

operating said switch to alternatively provide ones of said control signals from said first and second local buses to the digital storage device and to select a protected mode of operation thereof;

selectively operating the digital storage device in said protected mode of operation, said protected mode of operation including at least one of a write-only and read-only mode of operation; and selectively operating said digital storage device responsive to said control signals in (i) a read mode of operation for reading previously stored data and (ii) a write mode of operation for storing data.

45. A method of accessing a digital storage device using a digital computer system, the digital computer system including first and second system buses electrically independent of each other, master and slave central processing units connected to respective ones of said system buses, and a manually operative switch, the method comprising the steps of:

transmitting a write control signal from one of said master and salve processing units;

selectively storing data on said data storage device responsive to said write control signal; and operating said switch to selectively enable and disable receipt by the data storage device of said write control signal from said first and second system buses.

* * * * *